(12) United States Patent
Crockett (10) Patent No.: US 8,682,057 B2
(45) Date of Patent: *Mar. 25, 2014

(54) OPTICAL IMAGING AND ANALYSIS OF A GRAPHIC SYMBOL

(75) Inventor: Timothy W. Crockett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,262

(22) Filed: Apr. 26, 2012

(65) Prior Publication Data

US 2012/0207392 A1    Aug. 16, 2012

Related U.S. Application Data

(63) Continuation of application No. 12/331,071, filed on Dec. 9, 2008, now Pat. No. 8,249,328.

(51) Int. Cl.
*G06K 9/00* (2006.01)

(52) U.S. Cl.
USPC .......................................................... 382/137

(58) Field of Classification Search
None
See application file for complete search history.

(56) References Cited

U.S. PATENT DOCUMENTS

| | | | |
|---|---|---|---|
| 3,000,000 A | | 9/1961 | Eldredge |
| 3,764,978 A | | 10/1973 | Tyburski et al. |
| 3,987,411 A | * | 10/1976 | Kruklitis et al. ............... 382/208 |
| 4,584,703 A | | 4/1986 | Hallberg |
| 5,140,368 A | | 8/1992 | Szlucha |
| 5,253,304 A | * | 10/1993 | LeCun et al. .................. 382/102 |
| 5,371,798 A | * | 12/1994 | McWhortor ..................... 380/51 |
| 5,530,773 A | | 6/1996 | Thompson |
| 6,473,519 B1 | | 10/2002 | Pidhirny et al. |
| 6,505,778 B1 | | 1/2003 | Reddersen et al. |
| 6,986,464 B2 | | 1/2006 | Takiguchi et al. |
| 8,023,843 B2 | | 9/2011 | DeGruchy et al. |
| 8,249,328 B2 | * | 8/2012 | Crockett ........................ 382/137 |

(Continued)

FOREIGN PATENT DOCUMENTS

EP    0651345 A2    5/1995

OTHER PUBLICATIONS

Hu, Jianying "Document Classification Using Layout Analysis", Lucent Technologies Bell Labs, Murray Hill, NJ, pp. 1-5.

(Continued)

*Primary Examiner* — Chan S Park
*Assistant Examiner* — Ha Le
(74) *Attorney, Agent, or Firm* — Thomas E. Tyson; Jeffrey L. Streets (57) ABSTRACT

Method, computer program product, and apparatus are provided for identifying a graphic symbol within an image obtained by optical scanning. An image intensity is measured for each of a plurality of columns of the image, wherein each column has a length that extends across the graphic symbol in a first direction, and wherein the plurality of columns collectively extend across the graphic symbol in a second direction. The graphic symbol is then identified by matching a profile of the image intensity to a predetermined image intensity profile associated with a given graphic symbol. Optionally, the image is a digital image and the image intensity for each column is the sum of the image intensity for each pixel in that individual column. An image intensity differential between adjacent columns may be calculated for matching with a predetermined differential profile or comparison with an electronic profile generated by a magnetic scan.

17 Claims, 9 Drawing Sheets

(56) References Cited

U.S. PATENT DOCUMENTS

2002/0051562 A1* 5/2002 Sheppard et al. ............ 382/137
2003/0059099 A1 3/2003 Tateishi
2003/0161523 A1 8/2003 Moon et al.

OTHER PUBLICATIONS

Lovegrove, William et al."Text Block Recognition From Tiff Images" The Institution of Electrical Engineers, published by IEE (1995) London, pp. 4/1-4/6.

Bloomberg, Dan S. et al. "Document Image Summarization Without OCR" Xerox Palo Alto Research Center, Palo Alto, CA, IEEE (1996), pp. 229-232.

International Business Machines Corporation, "PCT/EP2009/066501, International Search Report and Written Opinion", dated Apr. 27, 2010, 12 pages.

Balm, "An Introduction to Optical Character Reader Considerations", XP-002577506, Pergamon Press 1970, vol. 2, printed in Great Britain, pp. 151-166.

* cited by examiner

| | | | | | | | | | | | | | | | | | | |
|---|---|---|---|---|---|---|---|---|---|---|---|---|---|---|---|---|---|---|
|0|0|0|0|0|0|0|0|0|0|0|0|0|0|0|0|0|0|0|
|0|0|0|0|0|0|0|1|1|1|1|1|1|1|1|1|1|1|1|
|0|0|0|0|0|1|2|4|5|5|5|5|5|5|5|5|5|5|5|
|0|0|0|0|0|2|5|8|10|10|10|10|11|11|11|11|11|11|11|
|0|0|0|0|1|3|7|11|13|13|13|13|13|13|13|13|13|13|13|
|0|0|0|0|1|4|8|13|13|13|13|13|13|13|13|13|13|13|13|
|0|0|0|0|1|4|9|13|13|13|13|13|13|12|11|11|11|11|11|
|0|0|0|0|1|4|10|13|13|13|13|11|9|8|7|7|7|7|7|
|0|0|0|0|1|5|10|13|13|13|11|8|6|5|4|4|4|4|4|
|0|0|0|0|1|5|10|13|13|12|9|7|4|3|2|2|2|2|2|
|0|0|0|0|1|5|10|13|13|12|8|5|3|1|0|0|0|1|1|1|
|0|0|0|0|1|5|10|13|13|11|7|4|2|0|0|0|0|0|0|
|0|0|0|0|1|5|10|13|13|11|7|4|1|0|0|0|0|0|0|
|0|0|0|0|1|5|10|13|13|11|8|4|2|1|0|0|0|0|0|
|0|0|0|0|1|5|10|13|13|11|8|4|2|1|0|0|0|0|0|
|0|0|0|0|1|5|10|13|13|11|8|4|2|1|0|0|0|0|0|
|0|0|0|0|1|5|10|13|13|11|8|4|2|1|0|0|0|0|0|
|0|0|0|0|1|5|10|13|13|11|8|4|2|0|0|0|0|0|0|
|0|0|0|0|1|4|10|13|13|12|8|4|1|0|0|0|0|0|0|
|0|0|0|0|0|4|10|13|13|12|8|4|1|0|0|0|0|0|0|
|0|0|0|0|1|5|10|13|13|12|9|6|3|1|1|1|1|1|1|
|0|0|0|0|2|6|10|13|13|13|11|8|6|5|4|4|4|4|4|
|0|0|0|1|4|7|11|13|13|13|13|12|11|10|10|10|10|10|10|
|0|1|2|4|6|9|12|13|13|13|13|13|13|13|13|13|13|13|13|

| 13 | 13 | 13 | 13 | 13 | 13 | 13 | 13 | 13 | 12 | 10 | 8 | 6 | 3 | 2 | 1 | 0 | 0 | 0 | 0 |
|---|---|---|---|---|---|---|---|---|---|---|---|---|---|---|---|---|---|---|---|
| 12 | 12 | 12 | 12 | 13 | 13 | 13 | 13 | 13 | 13 | 12 | 10 | 9 | 6 | 4 | 2 | 0 | 0 | 0 | 0 |
| 8 | 8 | 8 | 8 | 10 | 12 | 13 | 13 | 13 | 13 | 13 | 12 | 9 | 6 | 2 | 0 | 0 | 0 | 0 | |
| 5 | 5 | 4 | 5 | 7 | 11 | 13 | 13 | 13 | 13 | 13 | 13 | 11 | 7 | 3 | 0 | 0 | 0 | 0 | |
| 2 | 2 | 2 | 3 | 5 | 9 | 13 | 13 | 13 | 13 | 13 | 13 | 11 | 7 | 3 | 0 | 0 | 0 | 0 | |
| 1 | 1 | 0 | 1 | 4 | 8 | 12 | 13 | 13 | 13 | 13 | 13 | 10 | 6 | 3 | 0 | 0 | 0 | 0 | |
| 0 | 0 | 0 | 0 | 3 | 8 | 12 | 13 | 13 | 13 | 13 | 12 | 10 | 6 | 3 | 0 | 0 | 0 | 0 | |
| 0 | 0 | 0 | 0 | 2 | 8 | 12 | 13 | 13 | 13 | 13 | 12 | 10 | 6 | 3 | 0 | 0 | 0 | 0 | |
| 0 | 0 | 0 | 0 | 3 | 8 | 12 | 13 | 13 | 13 | 13 | 12 | 10 | 6 | 3 | 0 | 0 | 0 | 0 | |
| 0 | 0 | 0 | 0 | 3 | 8 | 12 | 13 | 13 | 13 | 13 | 12 | 10 | 6 | 3 | 0 | 0 | 0 | 0 | |
| 0 | 0 | 0 | 0 | 3 | 8 | 12 | 13 | 13 | 13 | 13 | 12 | 10 | 6 | 3 | 0 | 0 | 0 | 0 | |
| 0 | 0 | 0 | 0 | 2 | 8 | 12 | 13 | 13 | 13 | 13 | 12 | 10 | 6 | 3 | 0 | 0 | 0 | 0 | |
| 0 | 0 | 0 | 1 | 3 | 8 | 12 | 13 | 13 | 13 | 13 | 12 | 10 | 6 | 3 | 0 | 0 | 0 | 0 | |
| 1 | 1 | 1 | 2 | 5 | 9 | 12 | 13 | 13 | 13 | 13 | 12 | 10 | 6 | 3 | 0 | 0 | 0 | 0 | |
| 3 | 3 | 3 | 4 | 6 | 10 | 13 | 13 | 13 | 13 | 13 | 12 | 10 | 6 | 3 | 0 | 0 | 0 | 0 | |
| 6 | 6 | 6 | 7 | 9 | 11 | 13 | 13 | 13 | 13 | 13 | 12 | 10 | 6 | 3 | 0 | 0 | 0 | 0 | |
| 10 | 10 | 10 | 10 | 12 | 13 | 13 | 13 | 13 | 13 | 13 | 13 | 10 | 6 | 3 | 0 | 0 | 0 | 0 | |
| 13 | 13 | 13 | 13 | 13 | 13 | 13 | 13 | 13 | 13 | 13 | 13 | 10 | 6 | 3 | 0 | 0 | 0 | 0 | |
| 13 | 13 | 13 | 13 | 13 | 13 | 13 | 13 | 13 | 13 | 13 | 12 | 9 | 6 | 3 | 0 | 0 | 0 | 0 | |
| 12 | 12 | 12 | 12 | 12 | 11 | 11 | 11 | 11 | 11 | 11 | 10 | 9 | 7 | 4 | 2 | 0 | 0 | 0 | 0 |
| 7 | 7 | 7 | 7 | 7 | 7 | 7 | 7 | 7 | 7 | 6 | 6 | 5 | 4 | 2 | 1 | 0 | 0 | 0 | 0 |
| 2 | 2 | 2 | 2 | 2 | 2 | 2 | 2 | 2 | 2 | 2 | 2 | 1 | 1 | 0 | 0 | 0 | 0 | | |
| 0 | 0 | 0 | 0 | 0 | 0 | 0 | 0 | 0 | 0 | 0 | 0 | 0 | 0 | 0 | 0 | 0 | 0 | | |
| 204 | 203 | 202 | 217 | 300 | 436 | 534 | 539 | 522 | 449 | 371 | 315 | 262 | 192 | 117 | 56 | 0 | 0 | 0 | 0 |
| 1 | −1 | −1 | 15 | 83 | 136 | 98 | 5 | −17 | −73 | −78 | −56 | −53 | −70 | −75 | −61 | −56 | 0 | 0 | 0 |

OPTICAL IMAGING AND ANALYSIS OF A GRAPHIC SYMBOL

CROSS-REFERENCE TO RELATED APPLICATIONS

This application is a continuation of co-pending U.S. patent application Ser. No. 12/331,071, filed on Dec. 9, 2008.

BACKGROUND OF THE INVENTION

1. Field of the Invention

The present invention relates to methods for identifying a graphic symbol in an image.

2. Background of the Related Art

Since about 1963, the banking industry has used Magnetic Ink Character Recognition (MICR) to facilitate automated and accurate processing of checks. MICR characters have unique fonts and are printed with a magnetic ink or toner, usually containing iron oxide. Magnetic printing is used so that the characters can be reliably read into a system, even when they have been overprinted with other marks such as cancellation stamps. The characters are magnetized in the plane of the paper with a north pole on the right side of each MICR character. The characters are read with a MICR read head which is a device similar in nature to the playback head in an audio tape recorder. As the characters move across the read head, the characters' bulbous shapes ensure that each letter induces the read head to produce a unique waveform. These unique MICR waveforms are used to reliably identify the printed character(s). The error rate for the magnetic scanning of the numbers at the bottom of a typical check is smaller than with existing optical character recognition systems. For well printed MICR, the rate of unreadable characters is usually less than 1% while the rate of misreading characters is about 1 per 100,000 characters.

U.S. Pat. No. 3,000,000 describes an automatic reading system that was one of the first efforts to use magnetic ink on a document that would be conveyed underneath a reading head to produce an output voltage. FIG. 1 of that patent shows the numeric characters 0-9 alongside the waveform that such characters would produce in the reading head. This basic concept has carried over into the MICR technology still in use today.

MICR is now standardized by the International Organization for Standardization (ISO) under standard 1004. The primary MICR font used in the United States, Canadian, UK and India is known as E-13B. The E-13B font includes only 14 characters, including the numbers 0-9 and four control characters transit, on-us, amount, and dash.

BRIEF SUMMARY OF THE INVENTION

One embodiment of the present invention provides a method comprising scanning an image including a graphic symbol with electromagnetic radiation, such as visible light or infrared radiation. An image intensity is measured for each of a plurality of columns of the image, wherein each column has a length that extends across the graphic symbol in a first direction, and wherein the plurality of columns collectively extend across the graphic symbol in a second direction. The graphic symbol is then identified by matching a profile of the image intensity to a predetermined image intensity profile associated with a given graphic symbol. Most conveniently, one or more graphic symbol may be identified by matching the image intensity profile to a predetermined profile in the same manner, or even using the same steps, as used to identify the graphic symbol using a signal profile obtained by magnetically scanning the magnetic ink used to print the graphic symbol.

Another embodiment of the invention provides a computer program product including computer usable program code embodied on a computer usable medium for identifying a graphic symbol. The computer program product includes computer usable program code for scanning an image including a graphic symbol with electromagnetic radiation. The computer usable program code also causes an image intensity to be measured for each of a plurality of columns of the image, wherein each column has a length that extends across the graphic symbol in a first direction, and wherein the plurality of columns collectively extend across the graphic symbol in a second direction. Computer usable program code may then identify the graphic symbol by matching a profile of the image intensity to a predetermined image intensity profile associated with a given graphic symbol.

DETAILED DESCRIPTION OF THE INVENTION

One embodiment of the present invention provides a method comprising scanning an image including a graphic symbol with electromagnetic radiation. An image intensity is measured for each of a plurality of columns of the image, wherein each column has a length that extends across the graphic symbol in a first direction, and wherein the plurality of columns collectively extend across the graphic symbol in a second direction. The graphic symbol is then identified by matching a profile of the image intensity to a predetermined image intensity profile associated with a given graphic symbol.

In another embodiment, the step of scanning an image including a graphic symbol with electromagnetic radiation includes scanning an image including a series of aligned graphic symbols. A series of aligned graphic symbols, for example, may be printed along the bottom edge of a check in the E-13B font. Accordingly, the series of aligned graphic symbols may include alphanumeric characters. In a further option, the font is a magnetic ink character recognition font that is printed on paper using magnetic ink.

In a further embodiment, the graphic symbols in the scanned image are in the same font used to obtain the predetermined image intensity profile. Use of a consistent font will produce a consistent image intensity profile. Should the font size be changed from image to image, it is possible to normalize the image intensity profile by multiplying the sum of the image intensity measurements by the ratio of the image font size (height) divided by the font size (height) used to obtain the predetermined image intensity profile.

In a still further embodiment, the series of aligned graphic symbols includes a magnetic ink character recognition font using magnetic ink and the method further comprises magnetically scanning the image to generate an electrical signal profile for each of the series of aligned graphic symbols. In this manner, each of the graphic symbols is identified by matching the electrical signal profile to a predetermined electrical signal profile associated with a given graphic symbol. Where the method has measured both an image intensity profile and an electrical signal profile, the method may further comprise comparing the image intensity profile for a given graphic symbol to the electrical signal profile for the same graphic symbol. Such as comparison may facilitate detecting a deviation between the image intensity profile and the electrical signal profile for the same graphic symbol, and determining that the graphic symbol has been misread in response to detecting a deviation greater than a setpoint amount. Because misreading a graphic symbol is a serious error, these steps utilize both image and magnetic profiles to identify any significant discrepancy between the profiles that would suggest that at least one of the profiles is incorrect.

It should also be recognized that the combined use of electromagnetic radiation scanning and magnetic scanning allows a method that avoids the limitations of either scanning technique when used alone. For example, electromagnetic radiation scanning with visible light may produce a skewed image profile when handwriting or other smudges appear over or adjacent the graphic symbols. On the other hand, magnetic scanning may produce a skewed image profile as a result of noise from nearby magnetic energy sources such as electric motors or florescent light ballasts. Accordingly, sources of noise that cause a skewed image profile using electromagnetic radiation scanning are different than those using magnetic scanning. Although the two scanning techniques may produce the same image profile under ideal conditions, the noise experienced in identifying graphic symbols in a commercial setting may produce two different image profiles. Beneficially, since the image profiles should be the same or very similar, a significant deviation between the image profiles indicates that at least one of the image profiles contains significant noise artifacts. The image profile that more closely matches one of the predetermined profiles (i.e., has less noise) is generally selected as the profile that should be relied upon to identify the graphic symbol. The selection of which image profile is more accurate is preferably made on a symbol-by-symbol basis.

In yet another embodiment where the method has measured both an image intensity profile and an electrical signal profile, the method may further comprise detecting a deviation between the electrical signal profile and the closest-matching predetermined electrical signal profile, and using the image intensity profile to verify the graphic symbol identified using the electrical signal profile in response to the deviation being greater than a setpoint amount. The electrical signal profile will typically be compared against one or more of the predetermined electrical signal profiles to identify a graphic symbol. The method may include selecting the graphic symbol on the basis that the deviation is less than a setpoint or on the basis that the deviation is less than the deviation with any other graphic symbol.

In a further embodiment, the image is a digital image. A digital image allows the image intensity to be measured for each pixel, or groups of pixels, in the digital image. Optionally, the image intensity for an individual column, which is among the plurality of columns in the image, is the sum of the image intensity for each pixel in that individual column. However, depending upon the pixel density and the font size of the graphic symbol, it is possible to measure the image intensity for only a subset of pixels in the digital image yet still identify the graphic symbol. Accordingly, the image intensity for an individual column of the plurality of columns may be the sum of the image intensity for each pixel in that individual column that is included in the subset.

Another embodiment includes determining an image intensity differential between each pair of adjacent columns, wherein the step of identifying the alphanumeric character by matching a profile of the image intensity includes matching a profile of the image intensity differential to a predetermined image intensity differential profile associated with a given alphanumeric character. An image intensity differential is the difference between the image intensity of a first column and the image intensity of a second column adjacent to the first column. Determining the differential between each pairing of adjacent columns in the image allows these differentials to collectively form the image intensity differential profile. Preferably, each pair of adjacent columns includes a left column and a right column, and wherein each image intensity differential is determined by subtracting the image intensity of the left column in a pair from the image intensity of the right column in the pair. These steps cause the profile to include increasing differential values corresponding to increases in column image intensity and decreasing differential values corresponding to decreases in column image intensity. In other words, a positive image intensity differential indicates increasing intensity and a negative image intensity differential indicates decreasing intensity.

In yet another embodiment, the steps of measuring and identifying are performed in real-time before completing the step of scanning. Alternatively, the image data may be stored for later analysis or batch processing.

Some point-of-sale printers used in retail stores have the capability of scanning the magnetic ink character recognition (MICR) graphic symbols on a check with both the magnetic read head and with an image scanner. It is desirable to use the data from both of these input sources to obtain and validate the MICR data on the check. Because existing optical character recognition (OCR) routines needed to convert the scanned MICR images into usable text are very computationally intensive, it is difficult and expensive to include OCR algorithms within the firmware of the printer. By contrast, the present invention offers a simpler way to convert the image data into a format that can be handling in a similar manner to the simpler magnetic MICR reading algorithm. In one preferred embodiment, the image scanner and the magnetic read head produce image profiles that may be processed using the same algorithm or steps to identify the graphic symbols. A significant reduction in data processing volume and a significant increase in data processing speed may be achieved in this manner.

An image including a graphic symbol may be scanned with various forms of electromagnetic radiation, such that the scan produces image intensity data for each of a plurality of columns of the image as described above. The electromagnetic radiation may be, for example, either visible light or infrared radiation that is sensed at each column. The image intensity is a measure of the amount of the MICR ink that either blocks transmission of the electromagnetic radiation through the substrate, typically paper, on which the MICR ink is printed, or reflects the electromagnetic radiation. As image intensity increases, the amount of electromagnetic radiation that transmits through the image to an opposing columnar sensor or sensors will decrease, or the amount of electromagnetic radiation that reflects off the image back to an adjacent columnar sensor or sensors will increase. Similarly, as the image intensity decreases, the amount of electromagnetic radiation that transmits through the image to an opposing columnar sensor or sensors will increase, or the amount of electromagnetic radiation that reflects off the image back to an adjacent columnar sensor or sensors will decrease. However, it is important to verify that the ink used is opaque (i.e., not transparent) to the electromagnetic radiation being used. For example, the magnetic ferrous ink that is typically used for printing MICR graphical symbols on checks has been found to be both optically opaque and infrared opaque.

The electromagnetic radiation intensity signal from one or more sensor, such as a phototransistor array, may be processed in either a circuit, firmware or software to create an MICR read curve or image intensity profile. Use of this data to identify the one or more graphical symbol in the image may be done in real time or stored for batch processing.

Figure 1:
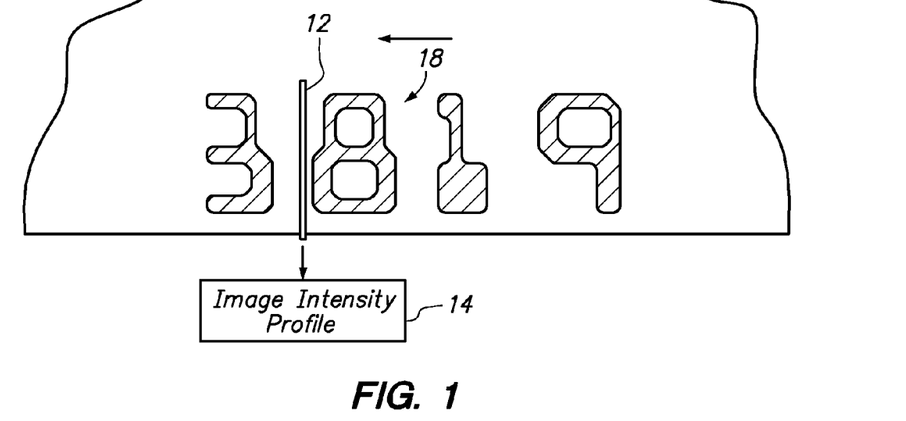
FIG. 1 is a diagram of four MICR graphic symbols printed on a paper check.

FIG. 1 is a diagram of four MICR graphic symbols "3 8 1 9" printed along the lower edge of a paper check 10. The graphic symbols are each in the E-13B font. A narrow sensor or slit 12 of an electromagnetic radiation scanner is positioned for scanning the "8" from left to right and producing an image intensity profile 14.

Figure 2A:
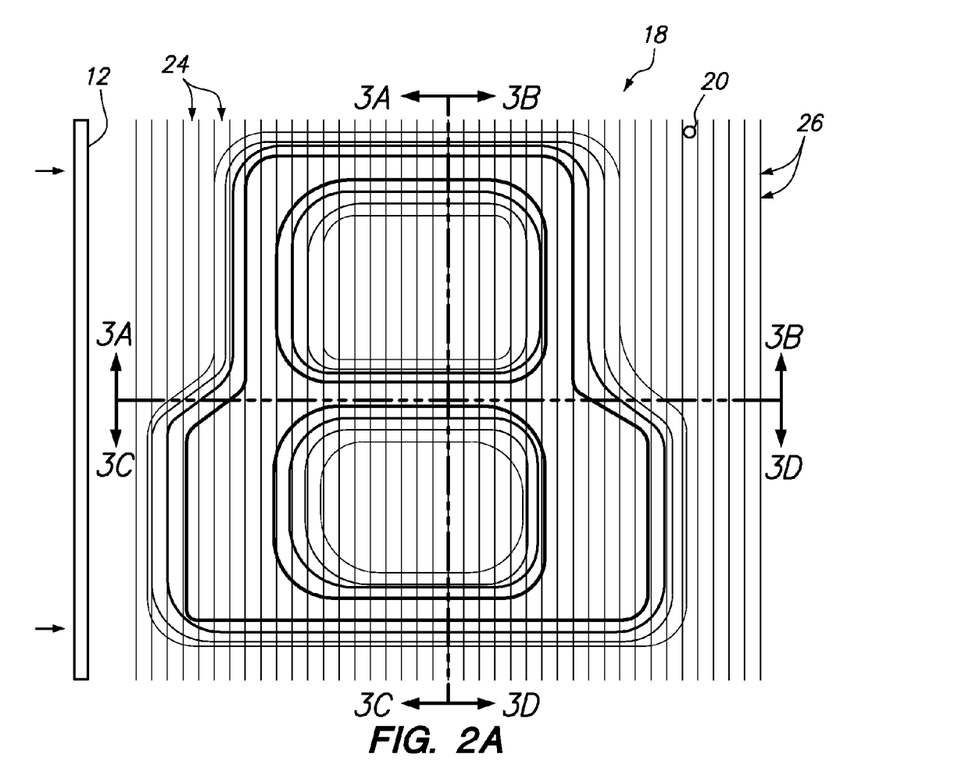
FIG. 2A is an image of the number "8" in the E-13B font showing regions of similar image intensity.

FIG. 2A is an image 18 of the number "8" in the E-13B font showing regions of similar image intensity. As the graphic symbol "8" moves relative to the scanning sensor or slit 12, an image intensity measurement is made at each column 24. Optionally, intensity measurements may be made for individual pixel 20 defined by columns 24 and rows 26. The collection of these image intensity measurements forms an image intensity profile, which lends itself to graphical illustration, for example as set out in FIG. 2B. The image intensity profile for each symbol in the E-13B font is unique and may be used to identify the symbol. Matching the measured image intensity profile against known profiles associated with each symbol in the font will produce a positive identification of the symbol that was scanned. In FIG. 2A, a set of contour lines are used to illustrate areas of substantially equal image intensity. Such contour lines are provided only for purposes of conforming to the limitations of patent drawings. A true graphical symbol would typically be printed to apply black ink over a continuous area defined by the font.

Figure 2B:
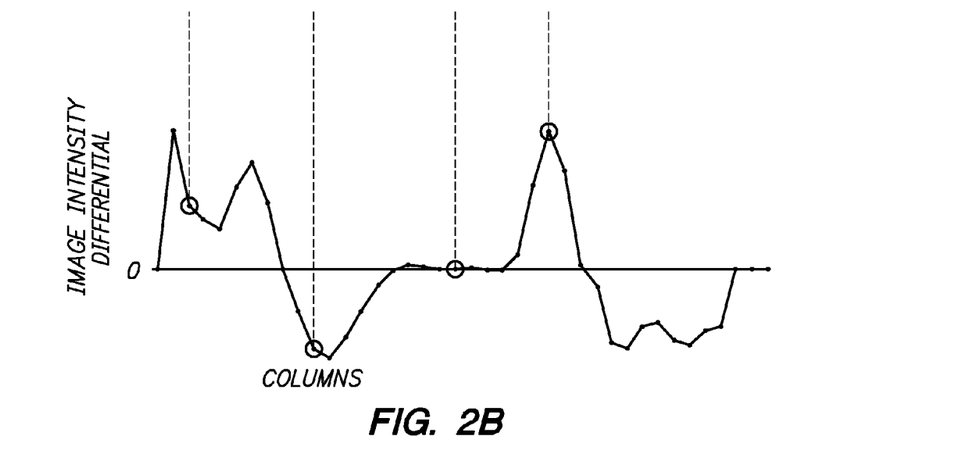
FIG. 2B is a graph of the image intensity differential between the column-by-column image intensity measurements for each pair of adjacent columns as a result of scanning from left to right.

FIG. 2B is a graph of the image intensity differential between the column-by-column image intensity measurements for each pair of adjacent columns as a result of scanning from left to right. An image intensity "differential" is calculated by subtracting the previous intensity measurement from the current intensity measurement. As a result, the profile has positive values where the image is increasing (more of the printed area) and has negative values where the image is decreasing (less printed area). A region of the profile where the intensity differential is zero means that the image intensity is constant, such as to the left of the "8" where there is no image, in the middle of the "8" where the three horizontal lines are not changing, and to the right of the "8" where there is no image.

FIGS. 3A-D are enlarged images of one-quarter of the number "8" from FIGS. 1 and 2A, which shows a numerical value of the image intensity measurement on a pixel-by-pixel basis. This type of data may be produced by a digital sensor, such as a linear array of phototransistors. As shown, each pixel 20 obtains an image intensity measurement from 0 (background only) to 13 (completely black image). The digital image is divided into vertical columns 24 (totaling 40 columns in FIG. 2A) and horizontal rows 26 (totaling 47 rows in FIG. 2A). Accordingly, the entire image 18 includes 1,880 pixels each having a measured image intensity value. As illustrated in row 30 (shown in FIGS. 3C and 3D), the sum of all the measured image intensity values in any given column is calculated. This value indicates the image intensity for that column. Optional row 32 provides the differential between adjacent column image intensity values, which is used in the graph in FIG. 3E.

Figure 3A:
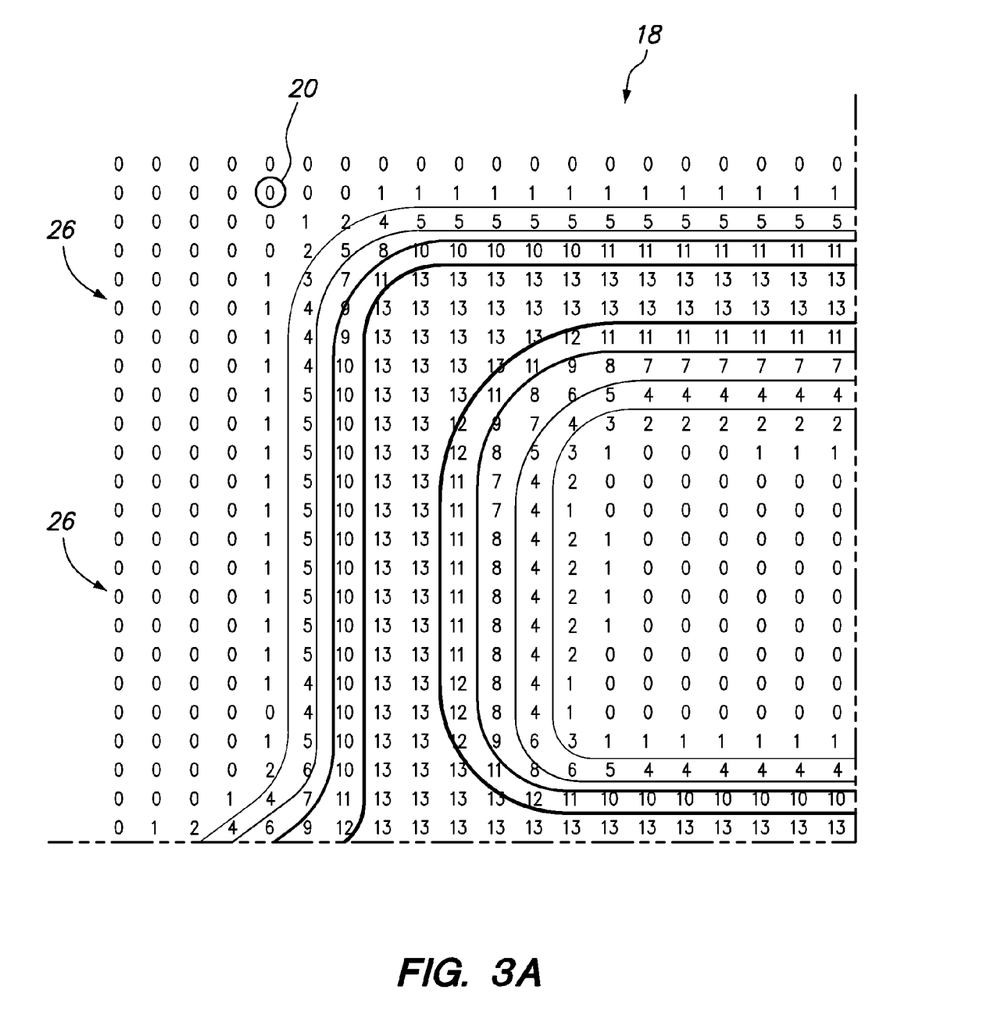
FIGS. 3A-D are enlarged images of one-quarter of the number "8" from FIGS. 1 and 2A, which shows a numerical value of the image intensity measurement on a pixel-by-pixel basis.
Figure 3B:
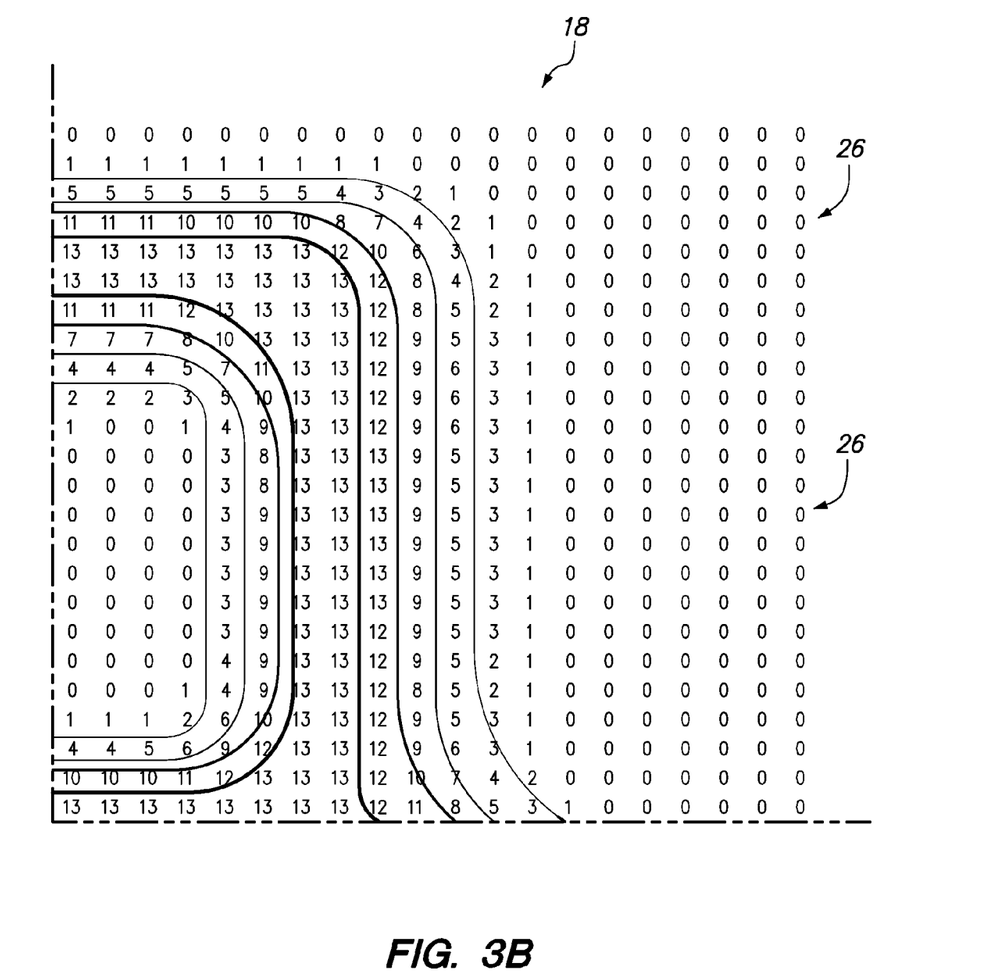
Figure 3C:
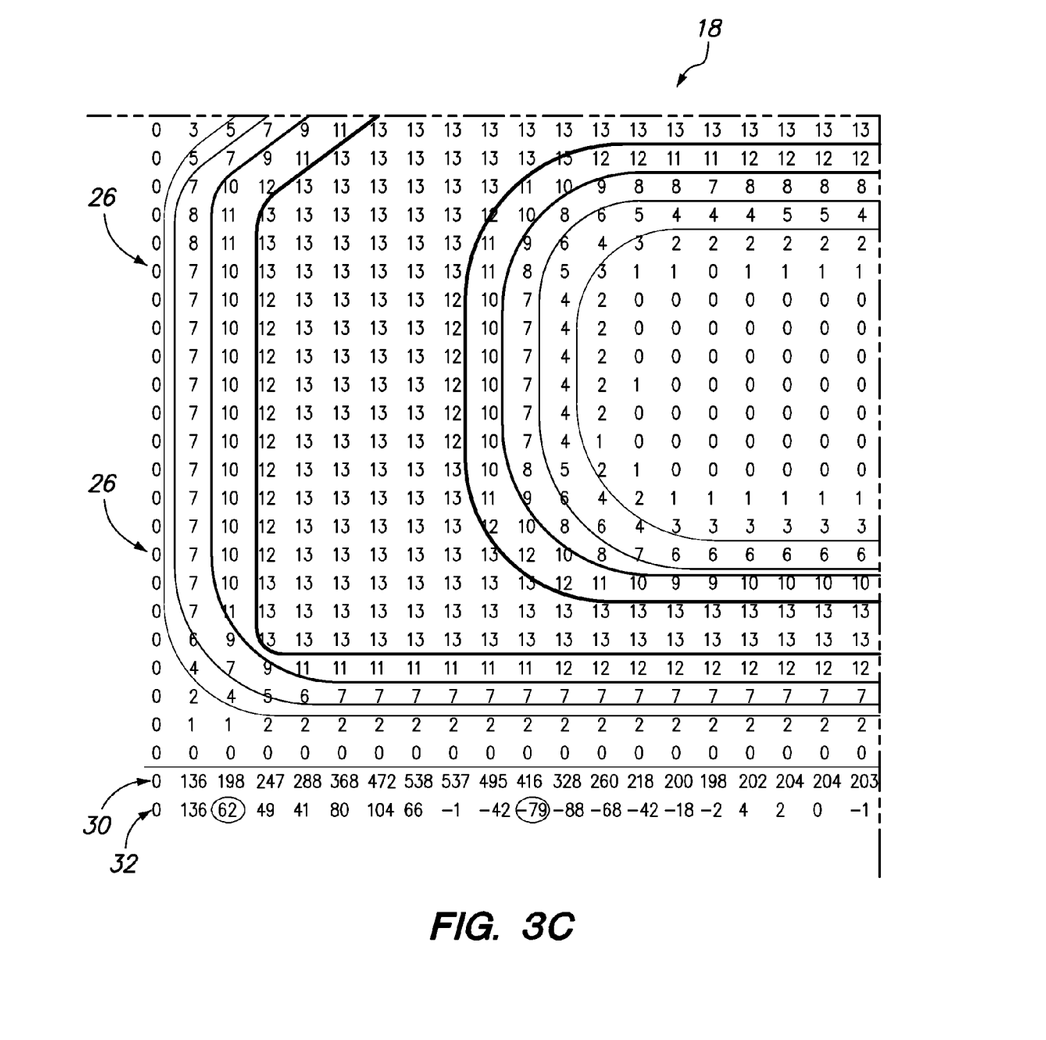
Figure 3D:
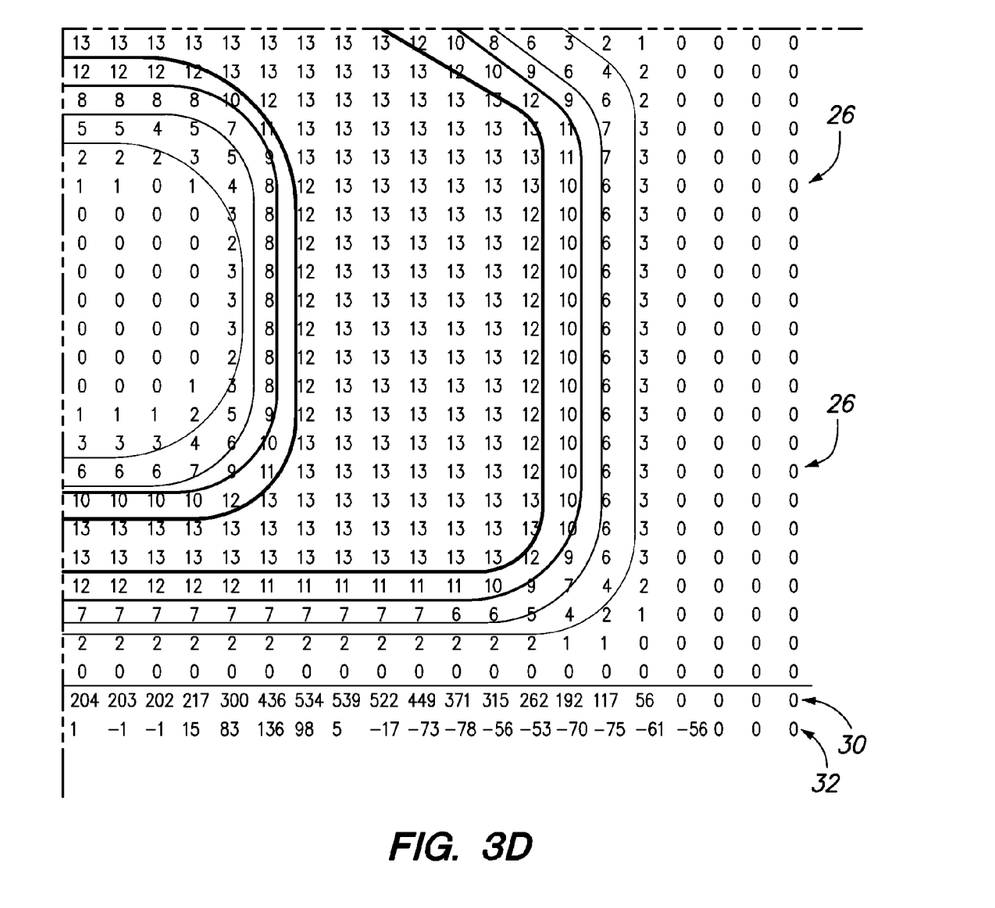
Figure 3E:
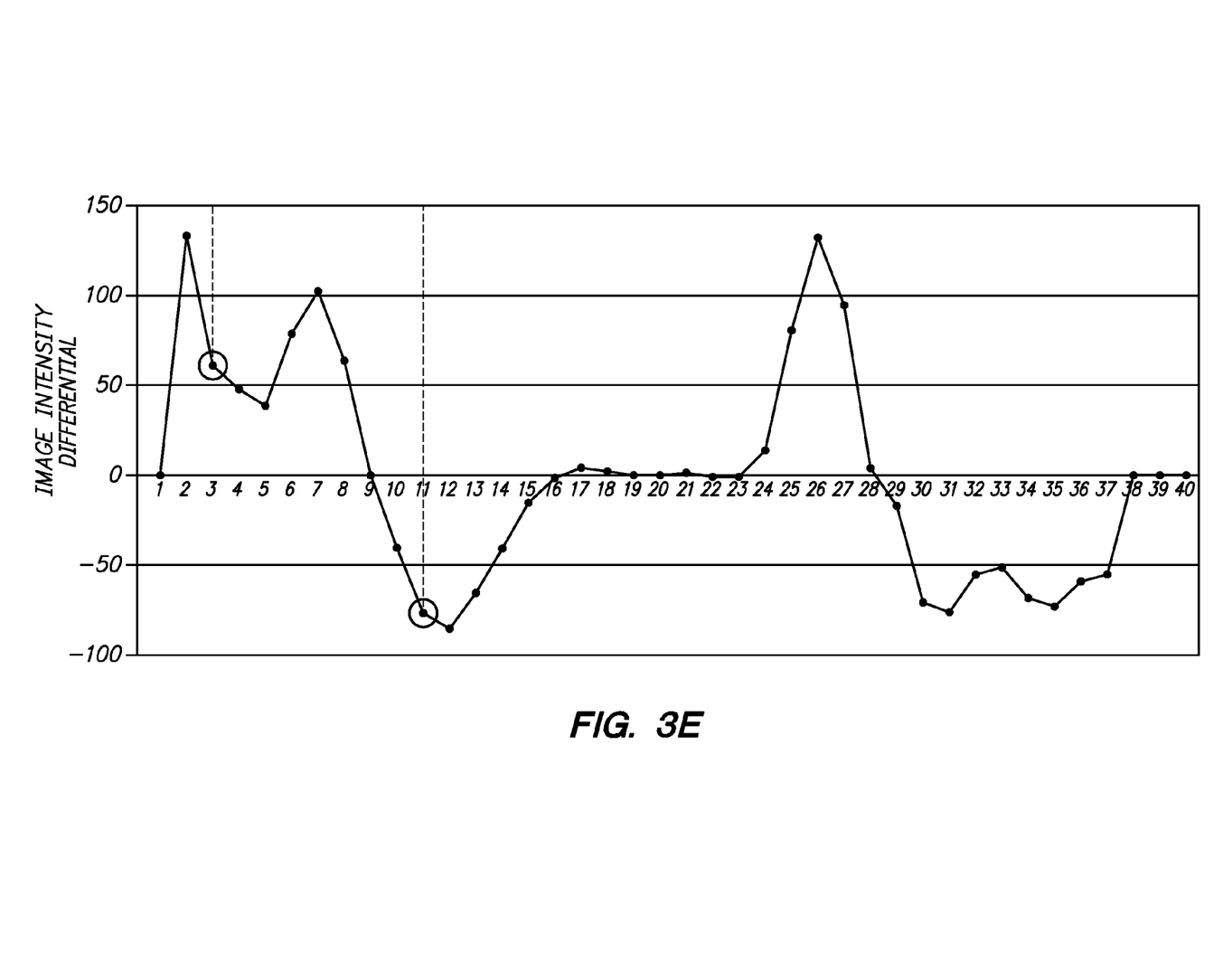
FIG. 3E is a graph of the image intensity differential between the columnar sum of image intensity measurements for each pair of adjacent columns.

FIG. 3E is a graph of the image intensity differential values, calculated by the difference between the columnar sums (found in row 30) of image intensity measurements for each pair of adjacent columns. For example, the column sum (row 30) of image intensity measurements for column 2 is 136 and the column sum for column 3 is 198. The image intensity differential value of 62 found in row 32 of column 3 is the difference between 198 (column 3 image intensity sum) and 136 (column 2 image intensity sum). The value of 62 is a positive value, which indicates that the image intensity increases from column 2 to column 3. By contrast, note that the image intensity differential value of −79 (see row 32) for column 11 is a negative value, which indicates that the image intensity decreases from column 10 to column 11. Because each of the graphical symbols is different, especially in an MICR font such as E-13B, this method produces a different profile (graph) for each graphical symbol that is part of an expected set of graphical symbols. Because the set of graphical symbols is predefined, a predetermined profile may be measured and stored as a standard of comparison for identifying each graphical symbol.

Figure 4:
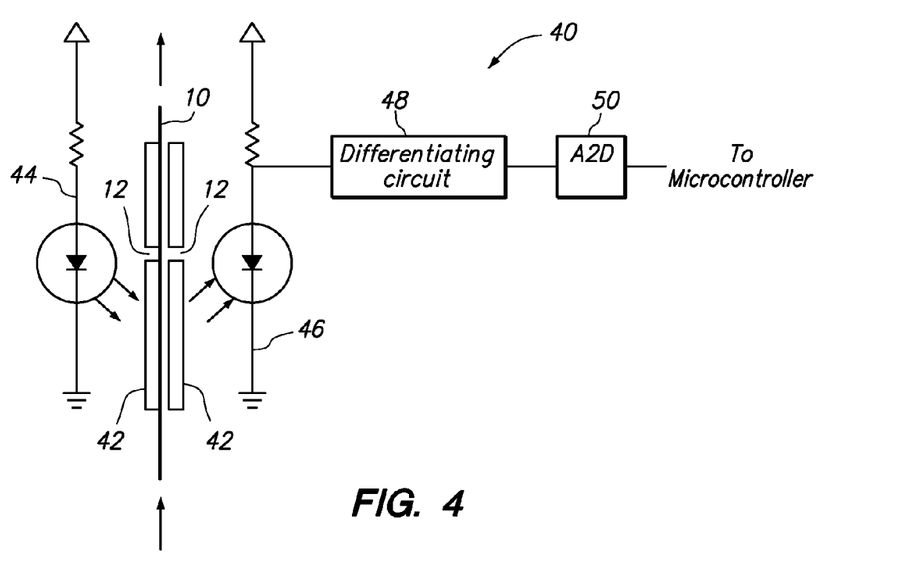
FIG. 4 is a schematic diagram of a MICR reader system based on infrared radiation.

FIG. 4 is a schematic top view of an MICR reader system 40 based on infrared radiation. A check 10 is drawn between two stationary plates 42 that have two directly opposing slits 12. The slits 12 form a narrow column (See also FIG. 1) that runs in and out of the page in this top view. Radiation from an infrared producing circuit 44 is directed to pass through the adjacent slit 12, through the paper check 10, and through the opposing slit 12 to an infrared sensor circuit 46. As the check 10 moves past the slit 12, infrared opaque graphical symbols printed on the check will cause a variation in the amount of infrared radiation that reaches the infrared sensor circuit 46. Accordingly, an electronic signal produced by the infrared sensor circuit 46 is communicated to a differentiating circuit 48, which may be used to calculate the intensity differential values as well perhaps including certain signal conditioning features. The image intensity values and/or image intensity differential values are sent to an analog-to-digital (A/D) converter 50 that produces a digital signal for use by a controller.

Figure 5:
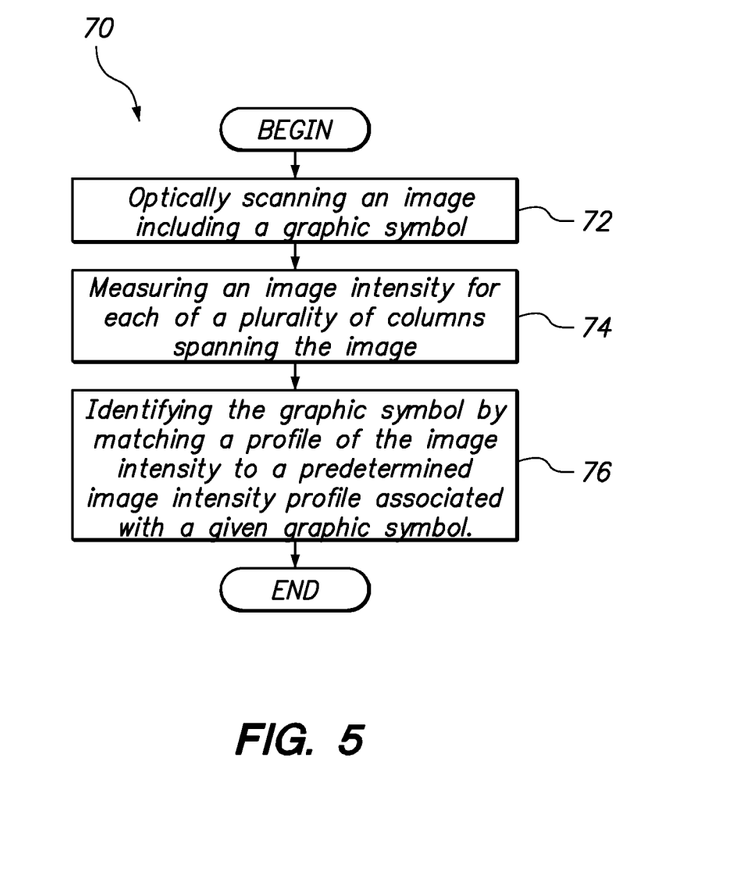
FIG. 5 is a flowchart of a method for identifying a graphical symbol in an image.
Figure 6:
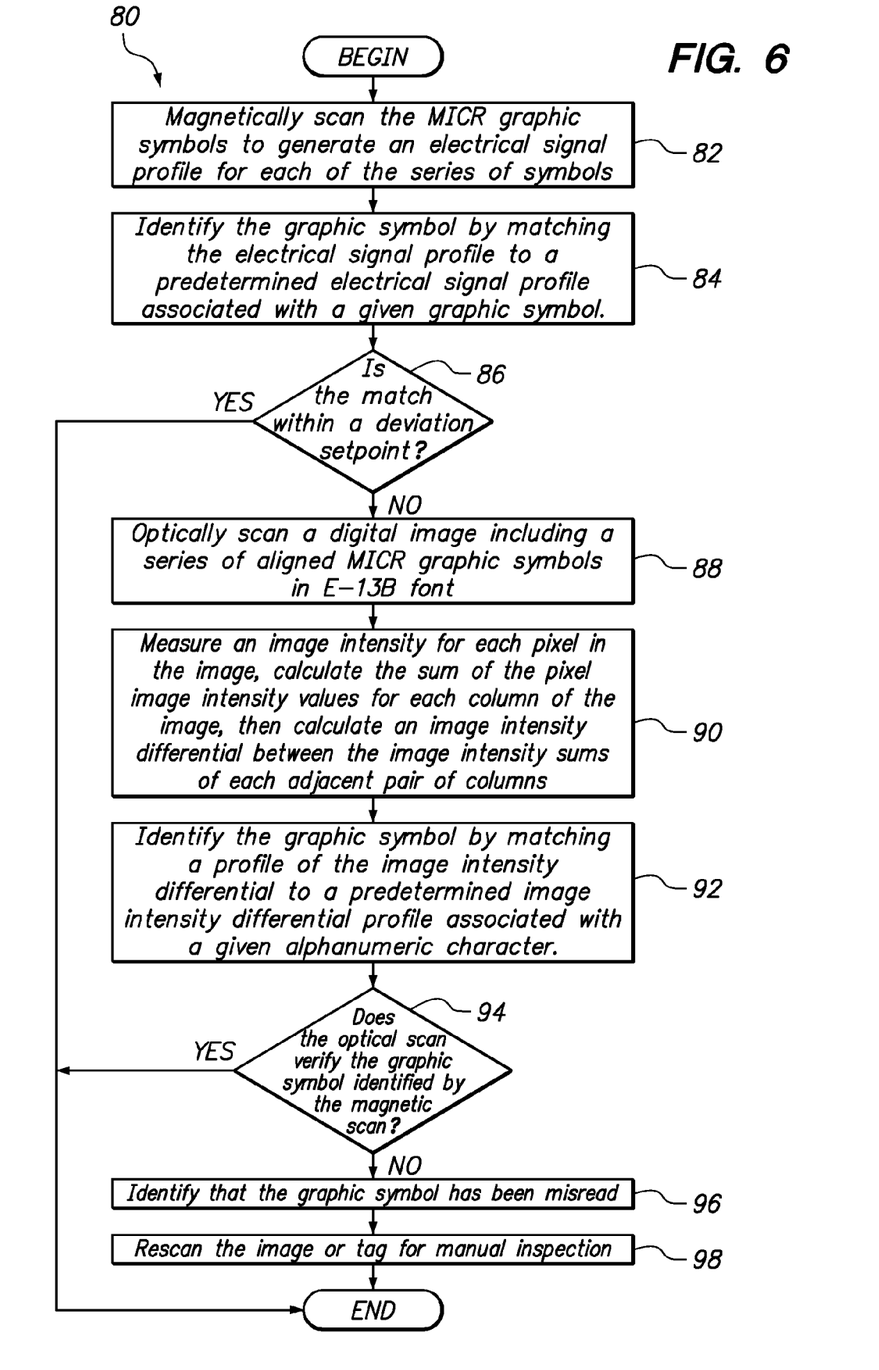
FIG. 6 is a flowchart of a method utilizing both magnetic and electromagnetic scanning of MICR graphic symbols to identify the graphic symbols with greater accuracy.

The discussion of FIGS. 5 and 6 is written in terms of an optical scan using visible light. However, it should be recognized that other forms of electromagnetic radiation may be similarly utilized, such as the infrared radiation discussed above.

FIG. 5 is a flowchart of a method 70 for identifying a graphical symbol in an image. In step 72, an image including a graphic symbol is optically scanned. The image intensity for each of a plurality of columns spanning the image is measured in step 74. Step 76 identifies the graphic symbol by matching a profile of the image intensity to a predetermined image intensity profile associated with a given graphic symbol. Although this ends the method as shown in FIG. 3, this method would typically be repeated for each graphic symbol encountered. It should be recognized that steps 72, 74 and 76 could be performed for one symbol and then the next symbol, or each step could be performed for all of the symbols before moving on to the next step.

FIG. 6 is a flowchart of a method 80 utilizing both magnetic and optical scanning of MICR graphic symbols to identify the graphic symbols with greater accuracy. This method is just one of many ways that the invention may be implemented to improve accuracy. In step 82, MICR graphic symbols are magnetically scanned to generate an electrical signal profile for each of the series of symbols. In step 84, the graphic symbols are identified by matching the electrical signal profile to a predetermined electrical signal profile associated with a given graphic symbol. It is then determined, in step 86 whether the match is within a deviation setpoint. If the match is within the deviation setpoint, meaning that the match is most likely accurate, then the method ends. However, if the match is not within the deviation setpoint, meaning that the match is not convincingly accurate, then the method continues to step 88. In step 88, an optical scan is made of a digital image including a series of aligned MICR graphic symbols in E-13B font. In step 90, the method measures the image intensity of each pixel in the image, calculates the sum of the pixel image intensity values for each column of the image, and then calculates an image intensity differential between the image intensity sums of each adjacent pair of columns. Having obtained the image intensity differential values, step 92 identifies the graphic symbol by matching a profile of the image intensity differential to a predetermined image intensity differential profile associated with a given alphanumeric character. Optionally, the predetermined image intensity differential may be obtained through an empirical calibration including repeated scanning of a series of known graphic symbols and averaging of the intensity measurements. Such a calibration could perhaps be specific to a given scanning system in order to account for variations in the condition of the equipment and software.

In step 94, it is determined whether the optical scan verifies the graphic symbol identified by the magnetic scan. In other words, an optical scan that identifies the same graphic symbol as the magnetic scan would be said to have verified the graphic symbol identified by the magnetic scan. Although this method only uses the optical scan to verify the magnetic scan, the invention is not so limited. It should be recognized that the optical scan could be the only scan, a primary scan with a secondary magnetic scan, or given equal weight as a magnetic scan. If the optical scan verifies the magnetic scan in step 94, then the method ends. However, if the optical scan does not verify the magnetic scan, then step 96 identifies that the graphic symbol has been misread and step 98 performs a rescan of the image or tags the scanned document for manual inspection.

Another embodiment of the invention provides a computer program product including computer usable program code embodied on a computer usable medium for identifying a graphic symbol. The computer program product includes computer usable program code for scanning an image including a graphic symbol. The computer usable program code also causes an image intensity to be measured for each of a plurality of columns of the image, wherein each column has a length that extends across the graphic symbol in a first direction, and wherein the plurality of columns collectively extend across the graphic symbol in a second direction. Computer usable program code may then identify the graphic symbol by matching a profile of the image intensity to a predetermined image intensity profile associated with a given graphic symbol.

It should be recognized that additional embodiments of the computer program product may including computer usable program code for performing any of the steps of any one or more of the foregoing methods, or variations of the stated methods that are within the scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    optically scanning an image including a graphic symbol using electromagnetic radiation;
    measuring an image intensity for each of a plurality of columns of the image, wherein each column has a length that extends across the graphic symbol in a first direction, and wherein the plurality of columns collectively extend across the graphic symbol in a second direction; and
    identifying the graphic symbol by matching a profile of the image intensity to a predetermined image intensity profile associated with a given graphic symbol.

2. The method of claim 1, wherein the image is a digital image.

3. The method of claim 1, wherein the steps of measuring and identifying are performed in real-time before completing the step of scanning.

4. The method of claim 1, wherein the step of scanning an image including a graphic symbol includes scanning an image including a series of aligned graphic symbols.

5. The method of claim 4, wherein the series of aligned graphic symbols include alphanumeric characters.

6. The method of claim 4, wherein the graphic symbols in the scanned image are in the same font used to obtain the predetermined image intensity profile.

7. The method of claim 6, wherein the font is a magnetic ink character recognition font.

8. The method of claim 7, wherein the image is printed on paper using magnetic ink.

9. The method of claim 7, wherein the font is selected from E-13B and CMC-7.

10. The method of claim 4, wherein the series of aligned graphic symbols includes a magnetic ink character recognition font using magnetic ink, the method further comprising:
    magnetically scanning the image to generate an electrical signal profile for each of the series of aligned graphic symbols; and
    identifying each of the graphic symbols by matching the electrical signal profile to a predetermined electrical signal profile associated with a given graphic symbol.

11. The method of claim 10, further comprising:
    comparing the image intensity profile for a given graphic symbol to the electrical signal profile for the same graphic symbol;
    detecting a deviation between the image intensity profile and the electrical signal profile for the same graphic symbol;
    determining that the graphic symbol has been misread in response to detecting a deviation greater than a setpoint amount.

12. The method of claim 10, further comprising:
    detecting a deviation between the electrical signal profile and the closest-matching predetermined electrical signal profile; and
    using the image intensity profile to verify the graphic symbol identified using the electrical signal profile in response to the deviation being greater than a setpoint amount.

13. The method of claim 2, wherein the image intensity is measured for each pixel in the digital image.

14. The method of claim 2, wherein the image intensity for an individual column of the plurality of columns is the sum of the image intensity for each pixel in that individual column.

15. The method of claim 2, wherein the image intensity is measured for a subset of pixels in the digital image.

16. The method of claim 2, wherein the image intensity for an individual column of the plurality of columns is the sum of the image intensity for each pixel in that individual column that is included in the subset.

17. A computer program product including computer usable program code embodied on a non-transitory computer usable medium for identifying a graphic symbol, the computer program product including:
- computer usable program code for optically scanning an image including a graphic symbol using electromagnetic radiation;
- computer usable program code for measuring an image intensity for each of a plurality of columns of the image, wherein each column has a length that extends across the graphic symbol in a first direction, and wherein the plurality of columns collectively extend across the graphic symbol in a second direction; and
- computer usable program code for identifying the graphic symbol by matching a profile of the image intensity to a predetermined image intensity profile associated with a given graphic symbol.

* * * * *